United States Patent
Fiori et al.

(10) Patent No.: US 6,313,218 B1
(45) Date of Patent: *Nov. 6, 2001

(54) LOW VOC, ISOCYANATE BASED AQUEOUS CURABLE COMPOSITIONS

(75) Inventors: Denise E. Fiori, Trumbull; David Ley, New Canaan; Richard Quinn, Bethel, all of CT (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/032,519

(22) Filed: Feb. 27, 1998

Related U.S. Application Data

(60) Provisional application No. 60/039,589, filed on Feb. 28, 1997.

(51) Int. Cl.[7] .................................................... C08F 2/32
(52) U.S. Cl. ........................... 524/801; 516/67; 516/925; 523/336; 525/123; 528/66
(58) Field of Search ..................... 516/67, 925; 523/336; 528/66; 524/801; 525/123

(56) References Cited

U.S. PATENT DOCUMENTS

| | | | | |
|---|---|---|---|---|
| 2,905,649 | * | 9/1959 | Craig et al. | 523/336 X |
| 4,234,468 | * | 11/1980 | Dalibor | 525/123 X |
| 4,321,173 | * | 3/1982 | Schuhmacher et al. | 523/336 X |
| 5,466,745 | * | 11/1995 | Fiori et al. | 524/801 |
| 5,508,372 | * | 4/1996 | Brahm et al. | 528/66 X |
| 5,552,477 | * | 9/1996 | Dhein et al. | 524/840 |
| 5,587,428 | * | 12/1996 | Jones et al. | 528/66 X |
| 6,005,045 | * | 12/1999 | Klanica | 525/123 X |

FOREIGN PATENT DOCUMENTS 0 663 413 * 7/1995 (EP) .

* cited by examiner

*Primary Examiner*—Richard D. Lovering
(74) *Attorney, Agent, or Firm*—Pennie & Edmonds LLP

(57) ABSTRACT

Provided is a low volatile organic content (VOC), isocyanate based curable oil-in-water emulsion of a polyisocyanate crosslinker and a surface active isocyanate reactive material in an aqueous medium, and a process for the preparation thereof. Also provided is a water-in-oil intermediate product to which an aqueous medium can be added to produce the curable oil-in-water emulsions. Such curable emulsions are particularly suited for use in coatings applications.

18 Claims, No Drawings

US 6,313,218 B1

LOW VOC, ISOCYANATE BASED AQUEOUS CURABLE COMPOSITIONS

This application claims the benefit of pending U.S. Provisional Application No. 60/039,589, filed Feb. 28, 1997.

BACKGROUND OF THE INVENTION

1. Field of the Invention

The present invention relates generally to low volatile organic compound (VOC) content, isocyanate based curable oil-in-water emulsions of a polyisocyanate crosslinker and a surface active isocyanate reactive material in an aqueous medium. The present invention also relates to methods for preparing such curable compositions as well as various end uses thereof, and a water-in-oil emulsion precursor suitable for use in preparing such curable compositions.

2. Description of the Related Art

Isocyanate crosslinked systems are in general well known. As an example, polyurethane films can be formed from coating compositions based upon polyols and polyisocyanate crosslinking agents. Polyurethane coatings can be formulated to provide fast curing characteristics, as well as a desirable combination of abrasion resistance, flexibility, adhesion, chemical resistance and appearance characteristics in the resulting films.

Due to the reactivity of isocyanates with active hydrogen containing compounds, including water, polyurethane coatings have historically been formulated as two component organic solvent based systems. One-component systems, both organic solvent based and waterborne (see GB 1530021 and GB 1530022), have also been formulated by blocking of the isocyanate groups via well-known blocking agents.

Despite the excellent films which can be achieved with some of these systems, and particularly the two-component organic solvent based systems, the coatings industry is under great pressure to reduce the environmentally undesirable emission of VOC's, which includes the organic solvent media as well as the common isocyanate blocking agents. One means of doing so, of course, would be to exchange some or all of the liquid organic solvent medium with water. Unfortunately, the switch from organic solvents to water is neither a simple nor straightforward matter, particularly in the case of common isocyanate crosslinkers which are not only reactive with water, but are also hydrophobic and nondispersible.

Several approaches to lowering the VOC of polyurethane coatings are discussed N. T. Cullen, "Low-VOC Polyurethane Coatings: Current Successes and Promising Developments," *American Paint & Coatings Journal*, Aug. 19, 1991, pp. 44–49 and 64. One such approach has been to preform a water-dispersible film-forming polyurethane polymer by reacting a polyisocyanate with a hydrophilic reactive component, then dispersing the so-preformed hydrophilic polymer in water. A variation on this approach disclosed in GB1162409 is to preform the polyurethane polymer in situ in the aqueous medium with the aid of non-reactive surfactants. A still further variation on this approach is described in EP-A-0369389, in which a lower molecular weight water-dispersible prepolymer containing residual isocyanate functionality is first formed by reaction of a mixture of isocyanates with a polyol chain containing hydrophilic groups, after which the prepolymer is dispersed in water and chain extended or crosslinked. Upon application of these preformed polymer systems to a substrate, films are formed primarily via physical drying mechanisms due to evaporation of the liquid medium (water). While such preformed polyurethane systems can significantly reduce emitted VOC's, they often can suffer from application and stability problems. In addition, films produced from such systems can suffer from poor water resistance due to the hydrophilic nature of the preformed polymers or surfactants remaining after cure.

In another approach disclosed in GB-A2018796 and U.S. Pat. No. 4,663,377, an emulsifiable polyisocyanate mixture comprising (a) a hydrophilic isocyanate functional oligomer and (b) a polyisocyanate, is produced by partially reacting a polyisocyanate with, for example, a hydrophilic polyether alcohol. Curable coating and adhesive compositions can be formed by combining these polyisocyanate emulsions with separate aqueous resins. The emulsifiable polyisocyanate mixtures of these references, however, suffer from low isocyanate content which results from the destruction of some of the isocyanate groups when the polyisocyanate is allowed to partially react with the polyether, as well as the destruction of some of the isocyanate groups due to the reaction with water upon and after emulsification. Predictably, a low isocyanate content would severely reduce the ability of these polyisocyanate mixtures to function as efficient crosslinkers in coating compositions. In addition, these polyisocyanate emulsions suffer from stability problems due to the reaction of isocyanate groups with water, particularly those on the hydrophilic component (a).

In a similar approach disclosed in U.S. Pat. No. 5,202,377, an emulsifiable polyisocyanate mixture comprising (a) a hydrophilic tertiary isocyanate functional oligomer and (b) a polyisocyanate having tertiary isocyanate groups, is produced by partially reacting a polyisocyanate containing tertiary isocyanate groups with a hydrophilic polyether. Coating compositions can be formed by combining (i) these polyisocyanate emulsions with (ii) separate aqueous solutions, emulsions or dispersions of film-forming polymers containing isocyanate-reactive functionality. These emulsifiable mixtures are said to produce more stable emulsions than those of U.S. Pat. No. 4,663,377 due to the lower reactivity of tertiary isocyanate groups. Despite the lower reactivity of the tertiary isocyanate groups, coatings produced from these emulsions may still suffer from low isocyanate content as well as stability problems.

Still another approach to reducing the VOC of isocyanate crosslinked systems is found in U.S. Pat. No. 5,075,370. This reference generically discloses an aqueous coating composition comprising an aqueous solution and/or dispersion of a surface active isocyanate reactive resin (anionic olefinic polyol) into which a specific relatively low viscosity liquid unblocked polyisocyanate crosslinker is emulsified. The disclosed aqueous coating compositions are produced by emulsifying the isocyanate crosslinker into the aqueous solution and/or dispersion of the isocyanate reactive resin to produce an oil-in-water emulsion. It has, however, been found that, when systems were prepared in accordance with the teachings of U.S. Pat. No. 5,075,370 (emulsification of the isocyanate into the aqueous resin solution/dispersion), the isocyanates do not properly incorporate into the resin solution/dispersion nor is an acceptable emulsion produced. After a short period of time a two phase system results, and films obtained from such systems display poor appearance characteristics, are hazy, contain microblisters, and have little or no gloss.

A solution to many of the problems associated with the systems disclosed in U.S. Pat. No. 5,075,370 has been described in U.S. Pat. No. 5,466,745. This patent teaches a curable aqueous oil-in water emulsion prepared by admixing an aqueous medium with a non-aqueous, emulsifiable composition comprising an unblocked polyisocyanate crosslinking agent and a surface active isocyanate reactive material. While excellent stability and ultimate film properties can be achieved with the systems of this patent, viscosity and mixing constraints of the emulsifiable composition may require the addition of diluents prior to admixture with the aqueous medium, thereby undesirably increasing the VOC of the final formulated composition.

All of the aforementioned references are incorporated herein for all purposes as if fully set forth.

It would, therefore, be highly desirable to achieve the excellent stability and film properties of the systems of U.S. Pat. No. 5,466,745, but at overall lower VOC contents of 2.1 lbs/gal (252 g/l) or less.

SUMMARY OF THE INVENTION

It has surprisingly been discovered that low VOC, isocyanate based aqueous curable compositions can be readily achieved when the primary components of the systems described in U.S. Pat. No. 5,466,745—the aqueous medium, isocyanate crosslinking agent (containing at least two reactive isocyanate groups, and which in and of itself is substantially hydrophobic and non-dispersible in water) and surface active isocyanate reactive material are formulated according to a process which, in accordance with a first aspect of the present invention, comprises the steps of:

(i) admixing (a) an unblocked isocyanate crosslinking agent containing at least two reactive isocyanate groups and being in and of itself substantially hydrophobic and non-dispersible in water, with (b) a mixture of (b1) a surface active isocyanate reactive material and (b2) an aqueous medium, wherein in the mixture (b) the surface active isocyanate reactive material (b1) is water-dispersible, in proportions and under conditions to produce a substantially homogenous curable water-in-oil emulsion having a VOC content of about 2.1 lbs/gal (252 g/l) or less; then (ii) admixing the curable water-in-oil emulsion from step (i) with an aqueous medium in proportions and under conditions to produce a substantially homogenous oil-in-water emulsion of the surface active isocyanate reactive material and the isocyanate crosslinking agent in water, the oil-in-water emulsion having a VOC content of about 2.1 lbs/gal (252 g/l) or less.

The present invention also relates to the precursor curable water-in-oil emulsion resulting from step (i). Specifically, this curable water-in-oil emulsion comprises a substantially homogenous emulsion of water in a substantially homogenous mixture of (b1) a surface active isocyanate reactive material which is water-dispersible, and (a) an unblocked isocyanate crosslinking agent containing at least two reactive isocyanate groups and being in and of itself substantially hydrophobic and non-dispersible in water, the curable water-in-oil emulsion having a VOC content of about 2.1 lbs/gal (252 g/l) or less, more preferably about 2.0 lbs/gal (240 g/l) or less, and especially about 1.9 lbs/gal (228 g/l) or less.

The present invention further relates to the substantially homogenous, curable oil-in-water emulsion prepared by the above process, and an aqueous curable composition based on this substantially homogenous, curable oil-in-water emulsion, possessing a VOC content of about 2.1 lbs/gal (252 g/l) or less, more preferably about 2.0 lbs/gal (240 g/l) or less, and especially about 1.9 lbs/gal (228 g/l) or less.

VOC content, for the purposes of the present invention, is measured in accordance with United States Environmental Protection Agency Method 24.

Optionally, such curable water-in-oil emulsions and the curable oil-in-water emulsions derived therefrom may also comprise one or more of a neutralizing agent for rendering the surface active isocyanate material water-dispersible, a relatively minor amount (at most) of an organic solvent, a cure catalyst, and other well known auxiliaries and additives suited for the particular end use, to the extent that such optional components do not raise the VOC content above the aforementioned level.

As with the curable oil-in-water emulsions of previously incorporated U.S. Pat. No. 5,466,745, the curable oil-in-water emulsions of the present invention, prepared by the process of the present invention, are substantially homogeneous; on standing, they do not separate into two phases and have a relatively long pot life before gelation; when cured, films obtained from curable oil-in-water emulsions prepared in accordance with the present invention have excellent physical and appearance characteristics; and, furthermore, by proper selection. of the emulsion components, films can be obtained which possess outstanding clarity and gloss, and contain minimal or no microblisters.

A particular advantage of the present invention over the teaching of U.S. Pat. No. 5,466,745, as discussed above, is that systems having very low VOC contents can be more readily and easily formulated.

These and other features and advantages of the present invention will be more readily understood by those skilled in the art from a reading of the following detailed description.

DETAILED DESCRIPTION OF THE PREFERRED EMBODIMENTS

The Unblocked Polvisocyanate Crosslinking Agent

Polyisocyanate crosslinking agents are generally well known in the art and have been extensively used in coating compositions in a monomeric, oligomeric and/or polymeric form. To function as an effective crosslinking agent, the polyisocyanate must have at least two reactive isocyanate groups.

As suitable polyisocyanate crosslinking agents for use in the present invention may be mentioned any liquid or solid organic polyisocyanate containing at least two reactive isocyanate groups. In addition, such polyisocyanate crosslinking agents should in and of themselves be substantially hydrophobic and non-dispersible in water. Suitable polyisocyanate crosslinking agents may contain aliphatically, cycloaliphatically, araliphatically and/or aromatically bound isocyanate groups. Mixtures of polyisocyanates are also suitable. Particularly preferred are those polyisocyanates containing aliphatically, cycloaliphatically and/or araliphatically bound polyisocyanates including, but not limited to, the following specific examples:

hexamethylene diisocyanate;

2,2,4-trimethylhexamethylene diisocyanate;

2,4,4-trimethylhexamethylene diisocyanate;

meta-$\alpha,\alpha,\alpha,\alpha'$-tetramethylxylylenediisocyanate (commercially available under the trade designation m-TMXDI™ aliphatic isocyanate from Cytec Industries Inc., West Paterson, N.J.);

para-$\alpha,\alpha,\alpha,\alpha'$-tetramethylxylylenediisocyanate; 1-isocyanato-3,3,5-trimethyl-5-isocyanatomethyl cyclohexane (isophorone diisocyanate, abbreviated as IPDI);

bis(4-isocyanatocyclohexyl)methane (hydrogenated MDI);

biuret derivatives of various diisocyanates including, for example, hexamethylene diisocyanate (commercially available under the trade designation Desmodur®N of Bayer Corp., Pittsburgh, Pa.);

uretdione derivatives of various diisocyanates including, for example, hexamethylene diisocyanate and IPDI;

isocyanurate derivatives of various diisocyanates including, for example, hexamethylene diisocyanate (commercially available under the trade designation Desmodur N 3390 of Bayer Corp., Pittsburgh, Pa.) and IPDI (commercially available under the trade designation IPDI T 1890 polyisocyanate of Huls America, Inc., Piscataway, N.J.); and urethane adducts of diisocyanates with polyols such as, for example, ethylene glycol, propylene glycol, neopentyl glycol, trimethylolpropane, pentaerythritol and the like, as well as oligomeric and polymeric polyors.

The preferred polyisocyanate crosslinking agents are those having at least one non-primary isocyanate group. Also preferred are the urethane diisocyanate/polyol adducts, more preferably those having an NCO content of at least 10 weight percent (on a 100% solids basis), and especially those wherein the diisocyanate contains at least one non-primary isocyanate group. Particularly preferred are such urethane adducts having an average NCO functionality of greater than 2, and especially the diisocyanate/trimethylolpropane adducts. An especially preferred example of such is the 3:1 meta-$\alpha,\alpha,\alpha,\alpha'$-tetramethylxylylenediisocyanate/trimethylolpropane adduct commercially available under the trade designation CYTHANE® 3174 aliphatic polyisocyanate of Cytec Industries Inc., West Paterson, N.J., which has the following properties:

| | |
|---|---|
| Non-Volatiles (% by weight) | 74 +/− 1.0 |
| NCO Content (% by weight on Solution) | 10.2 +/− 0.5 |
| Solvent | Butyl Acetate. |

Another preferred example of a 3:1 meta-$\alpha,\alpha,\alpha'$,$\alpha'$tetramethylxylylenediisocyanate/trimethylolpropane adduct has the following properties:

| | |
|---|---|
| Non-Volatiles (% by weight) | 72 |
| NCO Content (% by weight on Solution) | 9.6 |
| Solvent (90:10) | Methyl Amyl Ketone/Acetone. |

Another example of a diisocyanate/trimethylolpropane adduct is a 3:1 IPDI/trimethylolpropane adduct commercially available under the trade designation SPENLITE® 25-A4-60 aliphatic urethane prepolymer of Reichhold Chemicals, Research Triangle Park, N.C.

The Surface Active Isocyanate Reactive Material

The surface active isocyanate reactive material contains both (i) functionality capable of reacting with isocyanate groups, as well as (ii) hydrophilizing functionality capable of rendering the surface active isocyanate reactive material water dispersible. In this manner, in the ultimate curable oil-in-water emulsions the reactive material acts as a surfactant for emulsifying the isocyanate crosslinkers and other hydrophobic components. In the final film the surface active material is incorporated into the crosslinked network by virtue of its reactivity with the isocyanate crosslinkers, leading to improved water resistance.

The preferred surface active isocyanate reactive material is polymeric in nature, with the hydrophilizing groups and isocyanate reactive functionality being incorporated into the polymer via appropriate monomer selection and/or subsequent modification, as exemplified by a number of the previously incorporated references. As examples of such may be mentioned olefinic copolymers based on carboxy-functional ethylenically unsaturated monomers and hydroxyfunctional ethylenically unsaturated monomers; polyesters based on polybasic carboxylic acids and polyhydric alcohols; polyurethanes based on polyisocyanates, polyhydric alcohols and hydroxy acids; polyepoxy esters; and the like. Especially preferred for use in the present invention are the olefinic copolymers.

Isocyanate reactive functionality, as utilized herein, refers to functionality which is reactive with isocyanate groups under cure conditions of the curable emulsions. Such isocyanate reactive functionality is generally well known to those skilled in the relevant art and includes, most commonly, active hydrogen containing functionality such as hydroxyl and amino groups. Hydroxyl is typically utilized as the isocyanate reactive functionality in coatings and is preferred for use in the present invention.

Hydrophilizing functionality is also generally well known to those skilled in the relevant art and includes, most commonly, anion generating, cation generating and hydrophilic non-ionic functionality. By anion generating and cation generating is meant functionality such as carboxyl (anion generating) or amino (cation generating) which, when appropriately neutralized, becomes hydrophilic in nature. Hydrophilic non-ionic functionality is, in and of itself, hydrophilic in nature. The amount of hydrophilizing functionality present in the isocyanate reactive material should, upon at least partial neutralization of the anion generating or cation generating groups (if present), be sufficient to render the isocyanate reactive material water-dispersible.

Besides the aforementioned carboxyl groups, other examples of suitable groups which generate anions upon neutralization include sulfonic and phosphoric groups. Besides the aforementioned amino groups (substituted and unsubstituted), other examples of suitable groups which generate cations upon neutralization may be mentioned substituted and unsubstituted sulphonate groups, and substituted and unsubstituted phosphite groups. As examples of suitable hydrophilic non-ionic functionality may be mentioned amine oxide, phosphine oxide, alkyl or aryl phosphate, and polyether (polyethylene oxide).

Preferred hydrophilizing groups for most applications are those which generate anions upon neutralization and, particularly, the carboxyl and sulfonic groups. Especially preferred are carboxyl groups.

When coating compositions are formulated from the oil-in-water emulsions of the present invention, it is especially preferred that the polyisocyanate crosslinker and the surface active isocyanate reactive material comprise the primary film-forming components of the coating. In such a case, the surface active isocyanate reactive material preferably possesses the following characteristics:

a number average molecular weight (Mn) of from about 1000 to about 50000, and more preferably from about 1000 to about 12000;

an acid number of from about 15 to about 150 mg KOH/G resin, more preferably from about 20 to about 70 mg KOH/G resin, and especially from about 35 to about 55 mg KOH/G resin; and an amount of hydroxyl groups of from about 2.5 weight percent to about 6 weight percent, more preferably from about 3 weight percent to about 5 weight percent, and especially from about 3.0% to about 4.0 weight percent (100% solids basis). In addition, the isocyanate reactive material should have a relatively low glass transition temperature (Tg) of 25° C. or less depending upon certain desired cure/drying characteristics. For example, for ambient cure systems the surface active isocyanate reactive material should have a low Tg of preferably below 0° C. to increase reactivity with the isocyanate crosslinking agent. Where fast physical drying characteristics are important, higher Tg materials may be used.

Particularly preferred surface active isocyanate reactive materials comprise copolymers of (meth)acrylic acid, hydroxyalkyl (meth)acrylates and, optionally, other free-radically polymerizable monomers which, when polymerized, meet the above characteristics. As exemplified by the previously incorporated references, production of such copolymers is well-known to those skilled in the relevant art and need not be discussed further.

For coating applications such as automotive refinish, which require the combination of short dry times along with the development of early hardness and solvent resistance, it was found that a longer chain hydroxyalkyl (meth)acrylate such as 4-hydroxybutyl (meth)acrylate is preferred. An especially preferred combination is the use of a long chain hydroxyalkyl (meth)acrylate and a crosslinker based on a tertiary polyisocyanate crosslinker. While a faster and more complete cure may be expected with a more flexible hydroxyl chain, the development of early dry time under ambient conditions, and hardness under forced dry conditions is surprising. Incorporation of 5–20 wt %, preferably about 10 wt. %, styrene into a surface active acrylic polyol based on 2-hydroxyethyl (meth)acrylate also improves the dry time and early hardness of the system. Again, benefits of shorter dry time under ambient conditions and early hardness development under forced dry conditions were unanticipated. These improvements may be related to the fact that the introduction of styrene provides a smaller particle size distribution of the curable emulsion. Particle size was shown to effect the dry times of coatings prepared from surface active polyols based on (meth)acrylic monomers. In comparison, achieving the same properties of short dry time and early hardness by increasing the glass transition temperature of the (meth)acrylic based polyol can lead to coatings which do not develop complete solvent resistance. In particular, it has been found that the addition of styrene provides beneficial results when the polyol (i.e. the surface reactive isocyanate reactive material) has a hydroxyl content of less than about 2.1 wt. % (48% solids) and a Tg of less than about 15° C.

It should be noted that, for applications such as electrodeposition, the common hydrophilizing functionality is cation generating. Especially preferred in this case are amino groups, and similar constraints to those set forth above (with the exception of acid number being exchanged for amine equivalency) would apply to the surface active isocyanate reactive materials utilized in forming curable emulsions for this application.

Although the polyisocyanate crosslinker and the surface active isocyanate reactive material can be present in the water-in-oil and oil-in-water emulsions in varying amounts, when these components comprise the primary film-forming components of a subsequently formed coating, it is preferred that they be present in the emulsions in amounts such that the NCO:OH reactive functionality ratio is in the range of from about 0.5:1 to about 2:1, and especially in the range of from about 0.8:1 to about 1.2:1.

Optional Ingredients

As indicated earlier, the emulsifiable compositions may also comprise additional ingredients such as, for example, neutralizing agents for rendering the surface active isocyanate material water-dispersible, cure catalysts and relatively minor amounts of an organic solvent.

When an anion generating group is present on the isocyanate reactive material, any base may be used as the neutralizing agent to produce an anionic surface active material. Normally, a base capable of converting a carboxyl group to a carboxylate anion is used as the neutralizing agent, including organic and inorganic bases such as sodium and potassium hydroxide, sodium and potassium carbonate, and amines such as ammonia, primary, secondary and tertiary amines. Tertiary amines and ammonia are preferred, and particularly tertiary amines such as triethyl amine.

Similarly, when a cation generating group is present on the isocyanate reactive material, any acid may be used as the neutralizing agent to produce a cationic surface active material.

As discussed in further detail below, when utilized the neutralizing agents may be present at any stage of the process, for example, as a component of the aqueous medium or as a part of the surface active isocyanate reactive material (preneutralization). In any case, the total amount of neutralizing agent (when present) must at least be sufficient to render the surface active isocyanate reactive material water dispersible. The level of neutralization can have an effect on the particle size distribution of the final oil-in-water curable emulsion. Generally speaking, the small particle size oil-in-water emulsions tend to give faster dry times. For more hydrophobic polyols, decreasing neutralization can be expected to increase the particle size of the oil-in-water emulsion. For these systems, 85% neutralization is preferred. For more hydrophilic polyols, typically those with higher hydroxyl contents (greater than or equal to about 1.8 wt. % based on 48% solids) and higher glass transition (Tg) temperatures (greater than about 15° C.), a reduced level of neutralization can improve the compatibilization and give the desired smaller particle size distribution. In particular, it is desirable to decrease neutralization to about 30% to about 60%, preferably about 40% to about 50%. An indication of particle size can be obtained by observing the appearance of the oil-in-water emulsion. A bluish opalescence appearance indicates a desired particle size distribution. As the appearance becomes more milky it indicates a less desirable particle size distribution. Oil-in-water curable emulsions with a median particle size less than 0.2 microns are preferred, especially preferred emulsions have median particle size between 0.11 and 0.16 microns.

Cure catalysts for isocyanates are well known to those skilled in the relevant coatings art. Preferred are organometallic catalysts and, particularly, organotin compounds such as dibutyltin di-2-ethylhexoate, dibutyltin diisooctyl maleate, dibenzyltin di-2-ethylhexoate, dibutyltin dilaurate, dimethyltin dilaurate, tetrabutyl diacetoxy distannoxane, tetramethyl diacetoxy distannoxane, tetrapropyl diacetoxy distannoxane, dibutyltin dichloride, and the like. A preferred catalyst for tertiary polyisocyanates is a dimethyltin dicarboxylate sold under the trade name Fomrez® UL 28, Witco Corporation.

Any organic solvents present in the emulsifiable compositions are generally those present in the various components. For example, many coatings components are not commercially available on a 100% solids basis but are rather a somewhat lower solids content in an appropriate solvent as required to achieve a particular viscosity suitable for mixing.

Preferably, no other organic solvent (other than as contained in the components themselves) is or need be added to achieve acceptable results.

Depending on their end use, the emulsions of the present invention may also comprise other well known auxiliaries and additives. Those typically utilized in the coatings industry include, for example, foam inhibitors, leveling aids, pigments, pigment dispersing aids, dyes, UV absorbers (including hydroxy aryl triazine types (such as CYAGARD® UV-1164 of Cytec Industries Inc.), benzotriazole types (such as CYAGARD® UV-2337 of Cytec Industries Inc.) and benzophenone types), heat stabilizers, other stabilizing additives such as antioxidants, hindered amine light stabilizers (such as Sanduvor™3055 and 3058 of Clariant) and the like.

These optional ingredients are in general well-known to those skilled in the relevant art, as exemplified in the many previously incorporated references, and reference may be had thereto for further details. Reference may specifically be had to U.S. Pat. No. 4,426,471, U.S. Pat. No. 4,344,876, U.S. Pat. No. 4,619,956, U.S. Pat. No. 5,106,891, U.S. Pat. No. 5,322,868, U.S. Pat. No. 5,461,151, EP-A-0,434,608, EP-A-0,444,323 and EP-A-0,704,437, all of which are incorporated by reference herein as if fully set forth, for detailed discussions of the stabilization of coatings and other curable compositions with UV absorbers, hindered amine light stabilizers and/or other types of light stabilizers.

Process for Preparing the Curable Emulsions and the Curable Emulsions So Prepared As mentioned above, the process for preparing a low VOC, isocyanate based aqueous curable compositions in accordance with the present invention comprises the steps of:

(i) admixing (a) an unblocked isocyanate crosslinking agent containing at least two reactive isocyanate groups and being in and of itself substantially hydrophobic and non-dispersible in water, with (b) a mixture of (b1) a surface active isocyanate reactive material and (b2) an aqueous medium, wherein in the mixture (b) the surface active isocyanate reactive material (b1) is water-dispersible, in proportions and under conditions to produce a substantially homogenous curable water-in-oil emulsion having a VOC content of about 2.1 lbs/gal (252 g/l) or less; then (ii) admixing the curable water-in-oil emulsion from step (i) with an aqueous medium in proportions and under conditions to produce a substantially homogenous oil-in-water emulsion of the surface active isocyanate reactive mate isocyanate crosslinking agent in the aqueous medium, the oil-in-water emulsion having a VOC content of about 2.1 lbs/gal (252 g/l) or less.

Preferably, the water-in-oil and oil-in-water emulsions from steps (i) and (ii), respectively, have VOC contents of about 2.0 lbs/gal (240 g/l) or less, and especially about 1.9 lbs/gal (228 g/l) or less.

As is evident, a key aspect to obtaining improved results is to first prepare a water-in-oil emulsion of the components, then add additional aqueous medium until phase inversion occurs. Additional aqueous medium can then be added to adjust the resulting oil-in-water emulsions to the desired solids content and viscosity as appropriate for a chosen end use. The admixing can be accomplished by any number of well known techniques, but preferably by:

(i) adding the aqueous medium, either continuously or in portions, to the surface active isocyanate reactive material to produce a substantially homogenous mixture (wherein in the mixture the surface active isocyanate reactive material is water dispersible by appropriate content of non-ionic and/or neutralized ionic hydrophilizing functionality);

(ib) adding the isocyanate crosslinking agent, either continuously or in portions, to the mixture from (ia) in the desired proportions and under conditions (e.g., stirring at ambient temperature) so that a water-in-oil emulsion is produced;

(iia) adding additional aqueous medium, either continuously or in portions, to the water-in-oil emulsions from (ib) in an amount and under conditions (e.g., stirring at ambient temperature) until phase inversion occurs; then (iib) adding additional aqueous medium, either continuously or in portions, to the oil-in-water emulsions from (iia) in amounts and under conditions (e.g., stirring at ambient temperature) to achieve the desired solids content and viscosity.

In the aforementioned procedure, the neutralizing agent (if utilized) may be used to preneutralize the surface active isocyanate reactive material (which is preferred), and/or may be present as a part of the aqueous medium to neutralize during the initial mixing step (ia). In either case, sufficient neutralizing agent should be present in total in order to render the surface active isocyanate reactive material water-dispersible.

The aqueous medium may comprise solely water or may, as indicated above, comprises other components such as the neutralizing agent. Other than the neutralizing agent, the aqueous medium may also include any one of a number of other auxiliaries and additives common to the end use, as well as minor amounts (at most) of water-miscible organic solvents to ease emulsification or adjust viscosity, although this is not preferred. It is preferred that any such additional ingredients be incorporated along with the surface active isocyanate reactive material and isocyanate crosslinking agent; in other words, it is preferred that the aqueous medium comprise solely water, or comprise water and a neutralizing agent. Most preferably, the aqueous medium is just water.

As indicated above, in step (i) the aqueous medium and surface active isocyanate reactive material are mixed, followed by the isocyanate crosslinking agent, in proportions and under conditions to achieve a water-in-oil emulsion. The amount of each component required to achieve a water-in-oil emulsion, of course, will vary depending on a number of factors recognizable by those of ordinary skill in the relevant One important factor is the hydrophilicity/lipophilicity of the non-water components of the emulsion and the relationship that this has to the amount of water that can be present in the system before phase inversion occurs. It is, however, well within the abilities of the skilled person to determine by routine methods the phase inversion point of a formulated system and the amount of water which the system can tolerate prior to the onset of phase instability. Preferably, and typically, the water-in-oil emulsion will comprise up to about 50% by weight water, and more preferably from about 35% to about 45% by weight water.

From the determination of the phase inversion point of the formulated system, the skilled person is then readily apprised of the amount of additional aqueous medium that needs to be added in step (ii) to achieve phase inversion. Further, based on a particular chosen end use, the skilled person can readily adjust the solids/water content of the oil-in-water emulsions to those required for that end use.

Via the above procedure, substantially homogenous, curable, oil-in-water emulsions can be produced which may find use in a variety of fields including, for example, coatings and adhesives applications.

Coating Compositions

A primary utility of the curable oil-in-water emulsions of the present invention is in the coatings industry, for example, in automotive original equipment manufacturing (OEM), industrial maintenance, electrodeposition and, particularly, ambient temperature cure automotive refinish applications. They are also usable in architectural, coil, can, plastic and wood coating applications The curable emulsions may be utilized in clearcoat applications, or may contain a pigment for other applications.

For coatings applications, typical solids contents generally range from about 20% to about 75% by weight solids, but preferably are in the range of from about 30% to about 55% by weight solids, depending on the method of application chosen. For the purpose of the present invention, solids content is determined in accordance with ASTM D4713 (method B).

An especially preferred application for these curable emulsions is as an ambient temperature cure, automotive refinish clearcoat.

Coatings obtained from these curable emulsions may be applied to a variety of substrates in any desirable manner, such as by roller coating, spraying, brushing, sprinkling, flow coating, dipping, electrostatic spraying and electrophoresis. A preferred method of application is by spraying, and one skilled in the relevant art can formulate aqueous coating compositions so as to be spray applicable (e.g., with an appropriate spray viscosity) as indicated above.

Depending on the ultimate end use, coatings may be formulated as ambient or elevated temperature cure systems. For example, for refinish coatings applications the coatings will be formulated for ambient cure (although they may in fact be cured at elevated temperatures), whereas for automotive original equipment manufacturing (OEM) applications the coatings will be formulated for cure at elevated temperatures of, typically, 125° C.

Although the present invention is described with reference to certain preferred embodiments, it is apparent that variations or modifications thereof may be made by those skilled in the art without departing from the scope of this invention as defined by the appended claims.

EXAMPLE 1 duction of Low VOC Surface Active Isocyanate Reactive Material

2-Heptanone (MAK Solvent), 98% (71.1 g) was added to a 500 milliliter reactor equipped with a stirrer, a reflux condenser, and a thermocouple under a blanket of nitrogen and heated with oil to 148–150° C. A monomer feed mixture (393.9 grams total) consisting of butyl acrylate (50.34 wt %), 2-hydroxyethyl acrylate (21.96 wt %), methyl methacrylate (21.30 wt %), acrylic acid (6.41 wt %) was prepared and charged to a graduated cylinder attached to a feed pump. Di-tertiary amyl peroxide (d-t-APO) (21.9 grams total) was charged to a feed pump. Catalyst feed (1.6 g.) was added over thirteen minutes before the addition of monomer. Using a piston metering pump, the monomer was added to the reactor over five hours and eight minutes. During this time the reaction temperature reached a maximum of 152° C. The total reaction time was six hours and fifteen minutes. After the addition of all the monomer feed, 0.2 g. of catalyst was fed over an additional nineteen minutes. The reactor was heated and stirred at 146–150° C. for an additional thirty five minutes. The polymer solution was cooled and analyzed. The concentration was determined to be 84.4 weight percent. The relative number average molecular weight of the polymer solution was 3300; a polydispersity index of 3.2 was obtained via high pressure size exclusion chromatography compared against polystyrene standards. The glass transition temperature of a dried film was determined to be −6° C. via differential scanning calorimetry. The acidity was calculated to be 49.8 mg. KOH/g. resin solids of KOH per gram of solution; the hydroxy concentration was calculated to be 3.1 weight percent.(100% solids basis)

Production of Water Dispersible Isocyanate Reactive Material by Preneutralizing Acrylic Before Adding Water To 100 grams of the above acrylic add 6.64 grams of triethylamine, 99% and mix well. Add 71 grams of water and mix until dissolved. The theoretical non volatiles equals 47.6 weight percent solids. The theoretical weight percent water is 40.00. The theoretical weight percent solvent, including 3.6% triethylamine, is 12.4. The calculated acidity is 3.6 mg. of KOH per gram of solution; the calculated hydroxyl concentration is 1.5 weight percent(on solution).

EXAMPLE 2

Production of Low VOC Styrenic Surface Active Isocyanate Reactive Material

2-Heptanone (MAK Solvent), 98% (71.7 g) was added to a 500 milliliter reactor equipped with a stirrer, a reflux condenser, and a thermocouple under a blanket of nitrogen and heated with an oil bath to 148–151° C. A monomer feed mixture (395.8 grams total) consisting of styrene (10.00 wt %), butyl acrylate (50.00 wt %), 2-hydroxyethyl acrylate (21.96 wt %), methyl methacrylate (11.63 wt %), acrylic acid (6.41 wt %) was prepared. The monomer feed was charged to a graduated cylinder attached to a feed pump. Di-tertiary amyl peroxide (d-t-APO) (15.56 grams total) was charged to a feed pump. Catalyst feed (1.2 g.) was added over thirteen minutes before the addition of monomer. Using a piston metering pump, the monomer was added to the reactor over five hours and two minutes. During this time the reaction temperature reached a maximum of 151° C. The total reaction time was six hours and two minutes. After the addition of all the monomer feed, 0.8 g. of catalyst was fed over an additional seventeen minutes. The reactor was heated and stirred at 146–150° C. for an additional thirty minutes. The polymer solution was cooled and analyzed. The concentration was determined to be 84.1 weight percent. The relative number average molecular weight of the polymer solution was 4400; a polydispersity index of 6.7 was obtained via high pressure size exclusion chromatography compared against polystyrene standards. The glass transition temperature of a dried film was determined to be 0.3° C. via differential scanning calorimetry. The acidity was calculated to be 42 mg. of KOH per gram of solution; (49.9 mg. KOH/g. resin solids) the hydroxy concentration was calculated to be 3.1 weight percent.(100% solids basis)

Production of Water Dispersible Styrenic Isocyanate Reactive Material by Preneutralization Acrylic before adding Water To 100 grams of the above acrylic add 6.51 grams of triethylamine, 99% and mix well. Add 71.01 grams of water and mix until dissolved. The theoretical weight percent solids, equals 47.38. The theoretical weight percent water is 40.00. The theoretical weight percent solvent, including 3.63% triethylamine, is 12.62. The calculated acidity is 3.6 mg. of KOH per gram of solution; the calculated hydroxyl concentration is 1.5 weight percent.(on solution)

EXAMPLE 3

Production of Low VOC Surface Active Isocyanate Reactive Material Using 4-Hydroxy Butyl Acrylate 2-Heptanone (MAK Solvent), 98% (71.7 g) was added to a 500 milliliter reactor equipped with a stirrer, a reflux condenser, and a thermocouple under a blanket of nitrogen and heated with an oil bath to 148–151° C. A monomer feed mixture (387.1 grams total) consisting of butyl acrylate (40.81 wt %), 4-hydroxybutyl acrylate (27.88 wt %), methyl methacrylate (24.90 wt %), acrylic acid (6.41 wt %) was prepared. The monomer feed was charged to a graduated cylinder attached to a feed pump. Di-tertiary amyl peroxide (d-t-APO) (22.3 grams total) was charged to a feed pump. Catalyst feed (1.6 g.) was added over thirteen minutes before the addition of monomer. Using a piston metering pump, the monomer was added to the reactor over five hours and twenty two minutes. During this time the reaction temperature reached a maximum of 151° C. The total reaction time was six hours and two minutes. After the addition of all the monomer feed, 0.8 g. of catalyst was fed over an additional thirteen minutes. The reactor was heated and stirred at 149–150° C. for an additional fourteen minutes. The polymer solution was cooled and analyzed. The concentration was determined to be 82.5 weight percent. The relative number average molecular weight of the polymer solution was 3680; a polydispersity index of 9.7 was obtained via high pressure size exclusion chromatography compared against polystyrene standards. The glass transition temperature of a dried film was determined to be −8.0° C. via differential scanning calorimetry. The acidity was calculated to be 41 mg. of KOH per gram of solution; the (49.7 mg. KOH/g. solids) hydroxy concentration was calculated to be 3.1 weight percent. (100% solids basis)

Production of Water Dispersible Longer Chain Isocyanate Reactive Material by Preneutralization Acrylic Before Adding Water To 100 grams of the above acrylic add 6.39 grams of triethylamine, 99% and mix well. Add 71.0 grams of DI water to the neutralized acrylic and mix until dissolved. The theoretical weight percent solids, equals 46.51. The theoretical weight percent water is 40.00. The theoretical weight percent solvent, including 3.62% triethylamine, is 13.49. The calculated acidity is 3.5 mg. of KOH per gram of solution; the calculated hydroxyl concentration is 1.4 weight percent.(on solution)

EXAMPLE 4

Concurrent Addition of Amine and Water for Neutralization

The procedure described in Example 1 is repeated to produce a similar low VOC surface active isocyanate reactive material.

Production of Water Dispersible Isocyanate Reactive Material by Neutralization In water To 100 grams of the above acrylic add 6.67 grams of 99% triethylamine, in 71.1 grams of water and mix well. The theoretical non volatile, or weight percent solids, equals 48.49. The theoretical weight percent water is 40.00. The theoretical weight percent solvent, including 3.72% triethylamine, is 11.51. The calculated acidity is 3.6 mg. of KOH per gram of solution; the calculated hydroxyl concentration is 1.5 weight percent.(on solution)

EXAMPLE 5

Production of Low VOC Surface Active Isocyanate Reactive Material With Higher Hydroxy and Higher Glass Transition Temperature and Lower Acidity 2-Heptanone (MAK Solvent), 98% (71.1 g) was added to a 500 milliliter reactor equipped with a stirrer, a reflux condenser, and a thermocouple under a blanket of nitrogen and heated with oil to 148–150° C. A monomer feed mixture (396.8 grams total) consisting of butyl acrylate (21.99 wt %), 2-hydroxyethyl acrylate (32.04 wt %), methyl methacrylate (43.00 wt %), acrylic acid (2.96 wt %) was prepared and charged to a graduated cylinder attached to a feed pump. Di-tertiary amyl peroxide (d-t-APO) (21.3 grams total) was charged to a metering pump for controlled addition during the reaction. The d-t-APO is the free radical initiator for the polymerization. A portion of this catalyst feed (1.4 g.) was added over thirteen minutes before the addition of monomer. Using a piston metering pump, the monomer was added to the reactor over five hours and four minutes. During this time the reaction temperature reached a maximum of 152 ° C. The total reaction time was six hours. After the addition of all the monomer feed, 0.82 g. of catalyst was fed over an additional thirteen minutes. The reactor was heated and stirred at 146–150° C. for an additional thirty minutes. The polymer solution was cooled and analyzed. The concentration was determined to be 85.5 weight percent. The relative number average molecular weight of the polymer solution was 2540; a polydispersity index of 2.5 was obtained via high pressure size exclusion chromatography compared against polystyrene standards. The glass transition temperature of a dried film was determined to be 10° C. via differential scanning calorimetry. The acidity was calculated to be 20 mg. of KOH per gram of solution; (23.4 mg. KOH resin solids) the hydroxy concentration was calculated to be 4.5 weight percent. (100% solids basis)

Production of Water Dispersible Isocyanate Reactive Material by Neutralizing in Water To 100 grams of the above acrylic add 3.05 grams of 99% triethylamine in 68.7 grams of DI water and mix well. The theoretical non volatile, or weight percent solids, equals 49.79. The theoretical weight percent water is 40.00. The theoretical weight percent solvent, including 1.76% triethylamine, is 10.21. The calculated acidity is 1.7 mg. of KOH per gram of solution; the calculated hydroxyl concentration is 2.2 weight percent.(on solution)

EXAMPLE 6

Production of Low VOC Surface Active Isocyanate Reactive Material Containing Low Hydroxy Content and Low Glass Transition Temperature 2-Heptanone (MAK Solvent), 98% (150 g) was added to a 3 liter jacketed reactor equipped with a stirrer, a reflux condenser, and a thermocouple under a blanket of nitrogen and heated with oil to 148–150° C. A monomer feed mixture (2252 grams total) consisting of butyl acrylate (50.33 wt %), 2-hydroxyethyl acrylate (21.96 wt %), methyl methacrylate (21.30 wt %), acrylic acid (6.41 wt %) was prepared and MAK solvent was added (250 g). The monomer feed was charged to a graduated cylinder attached to a feed pump. Di-tertiary amyl peroxide (d-t-APO) (115 grams total) was charged to a feed pump. Catalyst feed (9.5 g.) was added over thirteen minutes before the addition of monomer. Using a piston metering pump, the monomer was added to the reactor over four hours and six minutes. During this time the reaction temperature reached a maximum of 152° C. The total reaction time was five hours and eleven minutes. After the addition of all the monomer feed, 8 g. of catalyst was fed over an additional twenty-one minutes. The reactor was heated and stirred at 146–150° C. for an additional thirty minutes. The polymer solution was cooled and analyzed. The concentration was determined to be 84.4 weight percent. The relative number average molecular weight of the polymer solution was 3840; a polydispersity index of 4.6 was obtained via high pressure size exclusion chromatography compared against polystyrene standards. The glass transition temperature of a dried film was determined to be −7° C. via differential scanning calorimetry. The acidity was calculated to be 42 mg. of KOH per gram of solution; (47.7 mg. KOH/g. resin solids) the hydroxy concentration was calculated to be 3.1 weight percent. (100% resin solids)

Production of Water Dispersible Isocyanate Reactive Material by Preneutralizing Acrylic Before Adding Water To 100 grams of the above acrylic add 6.44 grams of triethylamine, 99% and mix well. Add 70.96 grams of DI water to the neutralized acrylic. The theoretical non volatile, or weight percent solids, equals 47.58. The theoretical weight percent water is 40.00. The theoretical weight percent solvent, including 3.63% triethylamine, is 12.42. The calculated acidity is 3.6 mg. of KOH per gram of solution; the calculated hydroxyl concentration is 1.5 weight percent. (on solution)

EXAMPLE 7

Production of Low VOC Surface Active Isocyanate Reactive Material Containing Higher Hydroxy and Low Glass Transition Temperature 2-Heptanone (MAK Solvent), 98% (401.1 g) was added to a 3 liter jacketed reactor equipped with a stirrer, a reflux condenser, and a thermocouple under a blanket of nitrogen and heated with oil to 148–150° C. A monomer feed mixture (2174 grams total) consisting of butyl acrylate (43.20 wt %), 2-hydroxyethyl acrylate (32.06 wt %), methyl methacrylate (18.36 wt %), acrylic acid (6.41 wt %) was prepared and charged to a graduated cylinder attached to a feed pump. Di-tertiary amyl peroxide (d-t-APO) (96.7 grams total) was charged to a feed pump. Catalyst feed (8.7 g.) was added over sixteen minutes before the addition of monomer. Using a piston metering pump, the monomer was added to the reactor over five hours and thirty three minutes. During this time the reaction temperature reached a maximum of 156° C. The total reaction time was six hours and thirty six minutes. After the addition of all the monomer feed, 8.3 g. of catalyst was fed over an additional thirty three minutes. The reactor was heated and stirred at 148–156° C. for an additional thirty minutes. The polymer solution was cooled and analyzed. The concentration was determined to be 83.9 weight percent. The relative number average molecular weight of the polymer solution was 3920; a polydispersity index of 21.4 was obtained via high pressure size exclusion chromatography compared against polystyrene standards. The glass transition temperature of a dried film was determined to be −2° C. via differential scanning calorimetry. The acidity was calculated to be 42 mg. of KOH per gram of solution; (50 mg. KOH resin solids) the hydroxy concentration was calculated to be 4.5 weight percent. (100% solids basis)

Production of Water Dispersible Isocyanate Reactive Material by Neutralizing in Water at a Lower Percent Neutralization of Carboxylic Acid Groups To 100 grams of the above acrylic add 4.20 grams of 99% triethylamine in 69.47 grams of DI water and mix well. The theoretical non volatile, or weight percent solids, equals 48.30. The theoretical weight percent water is 40.00. The theoretical weight percent solvent, including 2.4% triethylamine, is 11.70. The calculated acidity is 10.9 mg. of KOH per gram of solution; the calculated hydroxyl concentration is 2.2 weight percent.(on solution)

EXAMPLE 8

Production of Low VOC Surface Active Isocyanate Reactive Material Containing Higher Hydroxy and Higher Glass Transition Temperature 2-Heptanone (MAK Solvent), 98% (401.1 g) was added to a 3 liter jacketed reactor equipped with a stirrer, a reflux condenser, and a thermocouple under a blanket of nitrogen and heated with oil to 148–150° C. A monomer feed mixture (2182 grams total) consisting of butyl acrylate (24.51 wt %), 2-hydroxyethyl acrylate (32.03 wt %), methyl methacrylate (37.06 wt %), acrylic acid (6.41 wt %) was prepared and charged to a graduated cylinder attached to a feed pump. Di-tertiary amyl peroxide (d-t-APO) (118.7 grams total) was charged to a feed pump. Catalyst feed (8.2 g.) was added over thirteen minutes before the addition of monomer. Using a piston metering pump, the monomer was added to the reactor over five hours and nine minutes. During this time the reaction temperature reached a maximum of 151° C. The total reaction time was six hours and thirty six minutes. After the addition of all the monomer feed, 9.8 g. of catalyst was fed over an additional thirty eight minutes. The reactor was heated and stirred at 146–151° C. for an additional thirty six minutes. The polymer solution was cooled and analyzed. The concentration was determined to be 83.9 weight percent. The relative number average molecular weight of the polymer solution was 3590; a polydispersity index of 5.2 was obtained via high pressure size exclusion chromatography compared against polystyrene standards. The glass transition temperature of a dried film was determined to be 10° C. via differential scanning calorimetry. The acidity was calculated to be 42 mg. of KOH per gram of solution; (50 mg. KOH/g resin solids) the hydroxy concentration was calculated to be 4.8 weight percent. (100% solids basis)

Production of Water Dispersible Isocyanate Reactive Material by Neutralizing in Water at a Lower Percent Neutralization of Carboxylic Acid Groups To 100 grams of the above acrylic add 2.6 grams of 99% triethylamine in 70.0 grams of DI water and mix well. The theoretical non volatile, or weight percent solids, equals 48.55. The theoretical weight percent water is 40.56. The theoretical weight percent solvent, including 2.4% triethylamine, is 10.89. The calculated acidity is 15.98 mg. of KOH per gram of solution; the calculated hydroxyl concentration is 2.19 weight percent. (on solution)

EXAMPLE 9

Production of Low VOC Surface Active Isocyanate Reactive Material Containing Low Hydroxy and Higher Glass Transition Temperature 2-Heptanone (MAK Solvent), 98% (401.1 g) was added to a 3 liter jacketed reactor equipped with a stirrer, a reflux condenser, and a thermocouple under a blanket of nitrogen and heated with oil to 148–150° C. A monomer feed mixture (2151 grams total) consisting of butyl acrylate (31.00 wt %), 2-hydroxyethyl acrylate (21.5 wt %), methyl methacrylate (40.64 wt %), acrylic acid (6.41 wt %) was prepared and charged to a graduated cylinder attached to a feed pump. Di-tertiary amyl peroxide (d-t-APO) (155.2 grams total) was charged to a feed pump. Catalyst feed (12.3 g.) was added over fifteen minutes before the addition of monomer. Using a piston metering pump, the monomer was added to the reactor over five hours and fifteen minutes. During this time the reaction temperature reached a maximum of 152° C. The total reaction time was six hours and forty three minutes. After the addition of all the monomer feed, 14.7 g. of catalyst was fed over an additional thirty three minutes. The reactor was heated and stirred at 146–152° C. for an additional thirty three minutes. The polymer solution was cooled and analyzed. The concentration was determined to be 83.9 weight percent. The relative number average molecular weight of the polymer solution was 2570; a polydispersity index of 3.0 was obtained via high pressure size exclusion chromatography compared against polystyrene standards. The glass transition temperature of a dried film was determined to be 4° C. via differential scanning calorimetry. The acidity was calculated to be 42 mg. of KOH per gram of solution; (50 mg. KOH/g. resin solids) the hydroxy concentration was calculated to be 3.1 weight percent. (100% basis solids)

Production of Water Dispersible Isocyanate Reactive Material by Neutralizing in Water at a Lower Percent Neutralization of Carboxylic Acid Groups To 100 grams of the above acrylic add 3.5 grams of 99% triethylamine in 70.0 grams of DI water and mix well. The theoretical non volatile, or weight percent solids, equals 48.36. The theoretical weight percent water is 40.00. The theoretical weight percent solvent, including 2.0% triethylamine, is 11.64. The calculated acidity is 13.1 mg. of KOH per gram of solution; the calculated hydroxyl concentration is 1.5 weight percent.(on solution)

EXAMPLE 10 TO 22

Production of Low VOC Surface Active Isocyanate Reactive Material

The procedure of Example 1 was followed to produce low VOC surface active isocyanate reactive materials. But, In these examples the desired attributes of the material were synthesized by variations of the monomer composition and the initiator feed rates.

Monomer Compositions Used in Examples 10 to 22.

The hydroxy concentration was adjusted by the amount of 2-hydroxyethyl acrylate monomer in the feed. In these examples the 2-hydroxyethyl acrylate monomer was varied between 21.95 to 32.03 weight percent. Thus, the hydroxy concentration varied from 3.2 to 3.8 weight percent. The glass transition was adjusted using both the butyl acrylate and the methyl methacrylate monomers. In these examples the butyl acrylate was adjusted from 24.42 to 50.33 weight percent of the monomer mixture. In these examples the methyl methacrylate was adjusted from 18.36 to 40.65 weight percent of the monomer mixture. Thus, the glass transition temperature varied from −13° C. to 18° C. via differential scanning calorimetry measurements. The acrylic acid monomer remained the same throughout these examples. The amount of acrylic acid monomer was 6.41 weight percent of the total monomer mixture in Examples 10 to 22.

Free Radical Initiator Quantity Used in Examples 10 to 22

In Examples 10 to 22 the catalyst was varied from 2.9 to 6.3 grams per hundred grams of monomer depending on the desired molecular weight. Thus, the number average molecular weight of the materials varied from 2580 to 4740 and the polydispersity index varied from 2.7 to 9.1 analyzed via high pressure size exclusion chromatography compared against polystyrene standards.

Production of Water Dispersible Isocyanate Reactive Material by Preneutralizing Acrylic Before Adding Water in Examples 10 to 22

The procedure of Example 1 was used to produce the water dispersible Isocyanate reactive material show in Table 1 as "Polyol Information", example numbers 10 to 22.

Production of Curable Emulsion A

To 11.3 g of surface active isocyanate reactive material produced by the procedure given in Example 1, were added under stirring, the following components in the listed order to produce a substantially homogeneous water-in-oil emulsifiable composition:

0.43 g of a 10 wt % solution of dibutyltin dilaurate in urethane grade propylene glycol monomethyl ether acetate, and 4.20 g of CYTHANE® 3174 aliphatic polyisocyanate resin (74 wt % solids in normal butyl acetate).

To this emulsifiable composition were added, at room temperature, four portions of water (10.4 g total) with the resulting mixture being stirred after each addition to give a substantially homogeneous oil-in-water emulsion. Curable emulsion A contained 32 wt % non-volatiles and an NCO/OH equivalent ratio of 1:1. Volatile organic compounds (VOC) were present at a level of not more than 2.1 lb/gal as calculated by EPA Method 24.

Production of Curable Emulsions B through P

Curable emulsions 13 through P were produced in a manner similar to Curable Emulsion A with the amount of CYTHANE being adjusted to maintain a 1:1 NCO/OH equivalent ratio. The amount of water added was also adjusted to maintain a workable final viscosity. Typical non-volatile content ranged from 26 to 39 wt %

Drawdowns of Curable Emulsions A-P were made on BONDERITEO® ED-5050 cold rolled steel panels, a product of Advanced Coating Technologies, Southfield, Mich. using a 76 micron wet film thickness wire cator. Wet films of 76 microns thickness corresponding to dry film thickness of 30 to 40 microns were obtained. The films were cured at room temperature to produce high gloss coatings.

TABLE 1

PROPERTIES OF ROOM TEMPERATURE CURED COATINGS

Polyol Information Film Properties after 7 days at 25° C.

| Curable Emul. | Example No. | Tg | OH* | Mn | Knoop Hardness | NCO reacted | MEK resistance | Appearance |
|---|---|---|---|---|---|---|---|---|
| A | 1 | −6 | 1.5 | 3300 | 7.0 | 90 | 200+ | Clear, no blisters |
| B | 10 | −13 | 2.1 | 2580 | 8.4 | 75 | 20/200+ | Clear, no blisters |
| C | 11 | −7 | 1.5 | 3840 | 9.3 | 93 | 200+ | Clear, no blisters |
| D | 12 | −7 | 2.1 | 3710 | 12.6 | 76 | 20/200+ | Clear, no blisters |
| D1–LN | 7 | −2 | 2.1 | 3920 | 10.2 | 63 | 30/200+ | Clear, no blisters |
| E | 13 | 14 | 1.5 | 3000 | 8.5 | 76 | 20/200+ | Clear, no blisters |
| F | 14 | 18 | 2.1 | 3060 | 7.9 | 57 | 20/200+ | Clear, no blisters |
| G | 15 | 15 | 1.5 | 4020 | 12.6 | 82 | 10/60 | Clear, no blister |
| G1–LN | 9 | 16 | 1.5 | 2574 | 14.4 | 61 | 120/200+ | Clear, no blisters |
| H | 16 | 18 | 2.1 | 3830 | 12.4 | 53 | 10/60 | Clear, no blisters |
| H1–LN | 8 | 15 | 2.1 | 3590 | 15.0 | 46 | 100/200+ | Clear, no blisters |
| I | 17 | −8 | 1.8 | 3100 | 10.6 | 67 | 10/150 | Clear, no blisters |
| J | 18 | 15 | 1.8 | 2980 | 9.3 | 54 | 10/80 | Clear, no blisters |
| K | 19 | −2 | 1.8 | 3050 | 9.3 | 62 | 10/150 | Clear, no blisters |
| L | 20 | 11 | 1.8 | 3740 | 10.1 | 62 | 10/150 | Clear, no blisters |
| M | 21 | 6 | 1.8 | 4740 | 12.4 | 63 | 10/150 | Clear, no blisters |
| N | 22 | 3 | 1.8 | 3550 | 10.5 | 61 | 10/150 | Clear, no blisters |
| O | 3 | −8 | 1.4 | 3680 | 8.9 | 87 | 200+ | Clear, no blisters |
| P | 2 | 0 | 1.5 | 4440 | 12.8 | 74 | 200+ | Clear, no blisters |

*wt % OH in isocyanate reactive polyol at 48% solids after neutralization and water addition

EXAMPLE 23

Curable Compositions Q and R. The use of UL 28 in place of dibutyltin dilaurate (DBTDL) also provides faster development of solvent resistance under ambient cure conditions. Curable compositions Q and R were prepared as in O and P except that 0.5 wt % Fomrezg UL 28 was substituted for DBTDL.

| Curable Composition | Catalyst | Film Cure Schedule: 1 day @ 25° C./ 50% RH MEK double rubs |
|---|---|---|
| O | DBTDL | 20/150 |
| Q | UL 28 | 10/200+ |
| P | DBTDL | 10/100 |
| R | UL 28 | 10/200+ |

EXAMPLE 24

Demonstration that the particle size distribution of the of oil-in-water curable emulsion as measured by emulsion appearance, influences the dry time of coating Curable Emulsion C, E, and F were prepared to give bluish and milky appearing oil-in-water emulsions. Bluish appearance correlates with a median particles size <0.2 microns for these acrylic polyols, milky appearance correlates with a median particle size >0.35 microns.

| Curable Emulsion | Appearance | Dry Time (hrs) |
|---|---|---|
| C | Milky | 4.25 |
| C | Bluish | 1.5 |
| E | Milky | 4.25 |
| E | Bluish | 1.5 |
| F | Milky | 4.25 |
| F | Bluish | 3.0 |

EXAMPLE 24

The use of lower percent neutralization of the carboxylic acid groups in the surface active isocyanate reactive material can produce more desirable smaller particle size oil-in-water emulsions for more hydrophilic polyols. Surface active polyols were prepared as described in Examples 10–22 to produce higher OH, low Tg polyols. These polyols were converted to curable emulsions and compared to the curable emulsion prepared from the more hydrophobic polyol described in Example 1.

| Polyol Characteristics | Tg ° C. | OH wt % | % Neutralizaiton | Curable Emulsion median particle siz (microns) |
|---|---|---|---|---|
| Hydrophilic | −4 | 2.1 | 85 | 0.457 |
| | −4 | 2.1 | 43 | 0.198 |
| | −8 | 1.8 | 85 | 0.290 |
| | −8 | 1.8 | 47 | 0.160 |
| | 16 | 1.5 | 85 | 130* |
| Comparative example | | | | |
| Hydrophobic | −8 | 1.5 | 85 | 0.153 |
| | −8 | 1.5 | 49 | 0.302 |

*bimodal particle size distribution

EXAMPLE 25

The incorporation of either a more hydrophobic monomer such as styrene in Example 2, or longer chain hydroxyl monomers such as 4-hydroxybutyl acrylate as in Example 3 provides both a faster dry time under ambient conditions and the development of early hardness under forced dry conditions, which can be important if buffing the coating is a key performance attribute.

| | | | | Properties at 40 min/60° C. | | |
|---|---|---|---|---|---|---|
| Polyol Characteristic | | | | Ambient Cure | | |
| Ex. | Hydroxy Monomer | Tg ° C. | Mn | OH wt % | Dry Time (hrs) | Knoop Hardness | MEK resistance |
| 1 | 2-HEA | −9 | 3300 | 1.5 | 3.5 | 1.7 | 10/60 |
| 2 | Styrene | 0 | 4440 | 1.5 | 1.0 | 6.6 | 20/200+ |
| 3 | 4-HBA | −8 | 3680 | 1.4 | 1.5 | 4.8 | 30/200+ |

We claim:

1. A process for preparing an isocyanate based, curable oil-in-water emulsion having a VOC content of about 2.1 lbs/gal (252 g/l) or less, comprising the steps of:
   (i) admixing (a) an unblocked isocyanate crosslinking agent containing at least two reactive isocyanate groups and being in and of itself substantially hydrophobic and non-dispersible in water, with (b) a mixture of (b1) a surface active isocyanate reactive material, comprising a styrene and (b2) an aqueous medium, wherein in the mixture (b) the surface active isocyanate reactive material (b1) is water-dispersible, in proportions and under conditions to produce a substantially homogenous curable water-in-oil emulsion having a VOC content of about 2.1 lbs/gal (252 g/l) or less; then
   (ii) admixing the curable water-in-oil emulsion from step (i) with an aqueous medium in proportions and under conditions to produce a substantially homogenous oil-in-water emulsion of the surface active isocyanate reactive material and the isocyanate crosslinking agent in water, the oil-in-water emulsion having a VOC content of about 2.1 lbs/gal (252 g/l) or less.

2. The process of claim 1, wherein the admixing of step (i) comprises:
   (a) adding the aqueous medium (b2) to the surface active isocyanate reactive material comprising styrene (b1) to produce a substantially homogenous mixture;
   (b) adding the isocyanate crosslinking agent to the substantially homogenous mixture so that the water-in-oil emulsion is produced;
   (c) adding an aqueous medium to the water-in-oil emulsion until a phase inversion occurs, forming the oil-in-water emulsion; and
   (d) adding additional aqueous medium to the oil-in-water emulsion such that said oil-in-water emulsion has a desired solids content and viscosity.

3. The process of claim 1, wherein the styrene is present in an amount of from about 5 wt. % to about 20 wt. % of the surface active isocyanate reactive material.

4. The process of claim 1 wherein the styrene is present in an amount of about 10 wt. % of the surface active isocyanate reactive material.

5. The process of claim 1, wherein the surface active isocyanate reactive material is at least partially neutralized and has a hydroxyl content of less than about 1.8 wt. % (based on 48% solids) and a Tg of less than about 15° C.

6. The process of claim 1 which further comprises adding a neutralizing agent to the aqueous medium (b2) employed in step (i).

7. The process of claim 1, wherein the aqueous medium (b2) comprises water and is added in an amount such that the water-in-oil emulsion comprises up to about 40% by weight water.

8. The process of claim 1, wherein said water is added in an amount such that the water-in-oil emulsion comprises from about 5% to about 25% by weight water.

9. The process of claim 1, wherein the unblocked isocyanate crosslinking agent comprises aliphatically, cycloaliphatically, araliphatically or aromatically bound isocyanate groups.

10. A curable water-in-oil emulsion comprising a substantially homogeneous emulsion of water in a mixture of an at least partially neutralized surface active isocyanate reactive material comprising a styrene, said mixture being dispersible in water and an unblocked isocyanate crosslinking agent containing at least two reactive isocyanate groups and being in and of itself substantially hydrophobic and non-dispersible in water, the curable water-in-oil emulsion having a VOC content of about 2.1 lbs/gal (252 g/l) or less.

11. The curable water-in-oil emulsion of claim 10, wherein the styrene is present in an amount of from about 5 wt. % to about 20 wt. % of the surface active isocyanate reactive material.

12. The curable water-in-oil emulsion of claim 10, wherein the styrene is present in an amount of about 10 wt. % of the surface active isocyanate reactive material.

13. The curable water-in-oil emulsion of claim 10, wherein said water-in-oil emulsion has a VOC content of less than about 2.0 lbs/gal.

14. The curable water-in-oil emulsion of claim 10, wherein said water-in-oil emulsion has a VOC content of less than about 1.9 lbs/gal.

15. The curable water-in-oil emulsion of claim 10, wherein the unblocked isocyanate crosslinking agent comprises aliphatically, cycloaliphatically, araliphatically and/or aromatically bound isocyanate groups.

16. A curable water-in-oil emulsion comprising a substantially homogeneous emulsion of water in a mixture of an at least partially neutralized surface active isocyanate reactive material comprising a long chain hydroxyalkyl (meth) acrylate which is dispersible in water and an unblocked isocyanate crosslinking agent containing at least two reactive isocyanate groups and being in and of itself substantially hydrophobic and non-dispersible in water, the curable water-in-oil emulsion having a VOC content of about 2.1 lbs/gal (252 gl) or less, wherein the surface active isocyanate reactive material comprises 4-hydroxybutyl acrylate.

17. A curable water-in-oil emulsion comprising a substantially homogeneous emulsion of water in a mixture of an at least partially neutralized surface active isocyanate reactive material comprising a long chain hydroxyalkyl (meth) acrylate which is dispersible in water and an unblocked isocyanate crosslinking agent containing at least two reactive isocyanate groups and being in and of itself substantially hydrophobic and non-dispersible in water, the curable water-in-oil emulsion having a VOC content of about 2.1 lbs/gal (252 gl) or less, wherein the unblocked isocyanate crosslinking agent comprises a tertiary polyisocyanate.

18. The curable water-in-oil emulsion of claim 17, wherein the surface active isocyanate reactive material comprises 4-hydroxybutyl acrylate.

* * * * *